US005499833A

United States Patent [19]

Her et al.

[11] Patent Number: 5,499,833

[45] Date of Patent: Mar. 19, 1996

[54] MANUALLY OPERATED WHEELCHAIR

[75] Inventors: Innchyn Her, Kaohsiung; Ping-Yi Chao, Taipei; Ming-Jang Huang, Taichung, all of Taiwan

[73] Assignee: National Science Council, Taipei, Taiwan

[21] Appl. No.: 426,575

[22] Filed: Apr. 21, 1995

[51] Int. Cl.$^{6}$ .............................. B62M 1/04; B62M 1/14

[52] U.S. Cl. ........................................ 280/247; 280/250.1

[58] Field of Search ................................ 280/247, 304.1, 280/250.1, 242.1, 244, 248, 253, 256

[56] References Cited

U.S. PATENT DOCUMENTS

| | | | |
|---|---|---|---|
| 2,643,898 | 6/1953 | Everest et al. | 280/247 X |
| 3,666,292 | 5/1972 | Bartos | 280/247 X |
| 4,762,332 | 8/1988 | Seol | 280/250.1 |

FOREIGN PATENT DOCUMENTS

| | | | |
|---|---|---|---|
| 2417662 | 10/1975 | Germany | 280/247 |
| 2532732 | 2/1976 | Germany | 280/247 |

*Primary Examiner*—Kevin T. Hurley

*Attorney, Agent, or Firm*—Hitt Chwang & Gaines

[57] ABSTRACT

A manually-operated wheelchair is disclosed, which includes a frame to which two front wheels and two rear wheels are fastened pivotally, wherein the frame is provided respectively on both left and right sides thereof with a horizontal fixation rod; and a connection rod control mechanism provided respectively on both left and right sides of the frame containing a coupling rod, an operating rod fastened at one end thereof with the coupling rod, a crank fastened pivotally at one end thereof with the coupling rod and at another end thereof with the horizontal fixation rod, a rocking rod fastened pivotally at one end thereof with the coupling rod and at another end thereof with the horizontal fixation rod, a transmission wheel which is mounted on a pivoting point of the fixation rod and the crank and is fastened securely with the crank such that the transmission wheel and the crank can be actuated synchronously, and a transmission chain-connecting the transmission wheel to an axle of the front wheel for transmitting motion from the transmission wheel to the front wheel.

6 Claims, 5 Drawing Sheets

MANUALLY OPERATED WHEELCHAIR

FIELD OF THE INVENTION

The present invention relates generally to a wheelchair, and more particularly to a wheelchair which is operated manually with ease and safety.

BACKGROUND OF THE INVENTION

As shown in FIG. 1, a prior art wheelchair 1 comprises mainly a seat frame 10 to which two casters 11 and two wheels 12 are fastened pivotally. The wheelchair 1 can be caused to move by driving the two wheels 12 with hands of a person sitting on the wheelchair 1. In addition, the seat frame 10 of the wheelchair 1 is provided respectively at the top ends of the left side and the right side of the rear portion thereof with a hand grip to facilitate the pushing of the wheelchair 1 by a person standing behind the wheelchair 1.

Such a prior art wheelchair as described above has inherent shortcomings, which are expounded explicitly hereinafter.

It is conceivably difficult and tiresome for a person, who is unable to walk and confined to the wheelchair 1 of the prior art, to drive the two wheels 12 so as to keep the wheelchair 1 on the move. Needless to say, the person can become severely strained if he or she drives the two wheels 12 with his or her hands so as to keep the wheelchair 1 moving at a speed as fast as 1.39 m/s, which is an average of the maximum effective speeds of the conventional manually-operated wheelchairs.

The action of driving the two wheels 12 of the prior art wheelchair 1 with both hands of a person who is confined to the wheelchair 1 can inflict a shoulder or elbow injury on the person.

The prior art wheelchair 1 is not provided with a braking means. As a result, the wheelchair 1 on the move must be stopped manually with both hands of a person who is confined to the wheelchair 1. Both hands and wrists of the person are therefore rather vulnerable to injury.

The prior art wheelchair 1 is in fact hazardous to the safety of a person who is confined thereto. The casters 11 and the wheels 12 of the wheelchair 1 are substantially different in size from each other. The wheelchair 1 is therefore highly vulnerable to accident, especially when the wheelchair 1 is driven on a bumpy surface.

With a view to overcoming some of the foregoing shortcomings of the prior art wheelchair 1, an improved wheelchair was disclosed in the U.S. Pat. No. 4,762,332. The improved wheelchair is provided with a transmission mechanism and an operating lever by which a person, who is confined to the wheelchair, can drive the wheelchair.

Such an improved wheelchair as disclosed in the U.S. Pat. No. 4,762,332 is inherently defective in design in that the operating lever is operative only in a one-way manner, and that the transmission mechanism is rather complicated in construction, and further that the improved wheelchair which is also provided with two casters and two large wheels is unsafe to ride on a surface in general and a bumpy surface in particular.

SUMMARY OF THE INVENTION

It is therefore the primary objective of the present invention to provide a manually-operated wheelchair which is easy, efficient and safe to operate.

In keeping with the principle of the present invention, the foregoing objective of the present invention is attained by a manually-operated wheelchair comprising mainly a seat frame to which two front wheels, two rear wheels, two suspension devices, two connection rod control mechanisms, and two transmission wheels are fastened. The two front wheels are provided respectively With a braking means while the two rear wheels are provided respectively with a suspension means. The seat frame is provided respectively on both sides thereof with a connection rod control mechanism having a operating rod and a transmission wheel. As the operating rods are swiveled back and forth, the transmission wheels are driven by the connection rod control mechanisms so as to keep the wheelchair on the move.

The foregoing objective, features, functions and advantages of the present invention will be more readily understood upon a thoughtful deliberation of the following detailed description of the present invention in conjunction with the accompanying drawings.

DETAILED DESCRIPTION OF THE EMBODIMENTS

Figure 1:
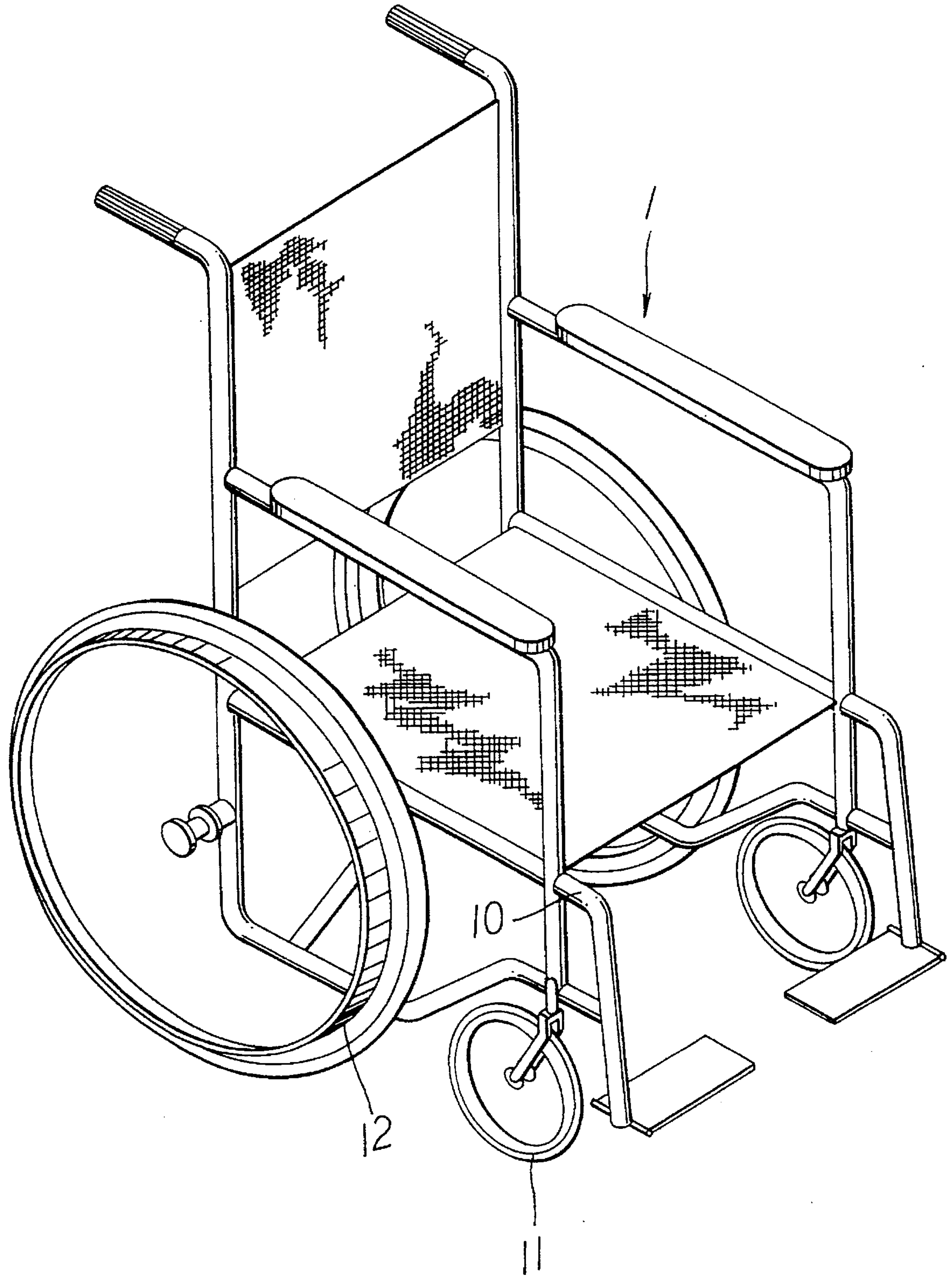
Fig. 1 (Prior Art)
FIG. 1 shows a perspective view of a manually-operated wheelchair of the prior art.
Figure 2:
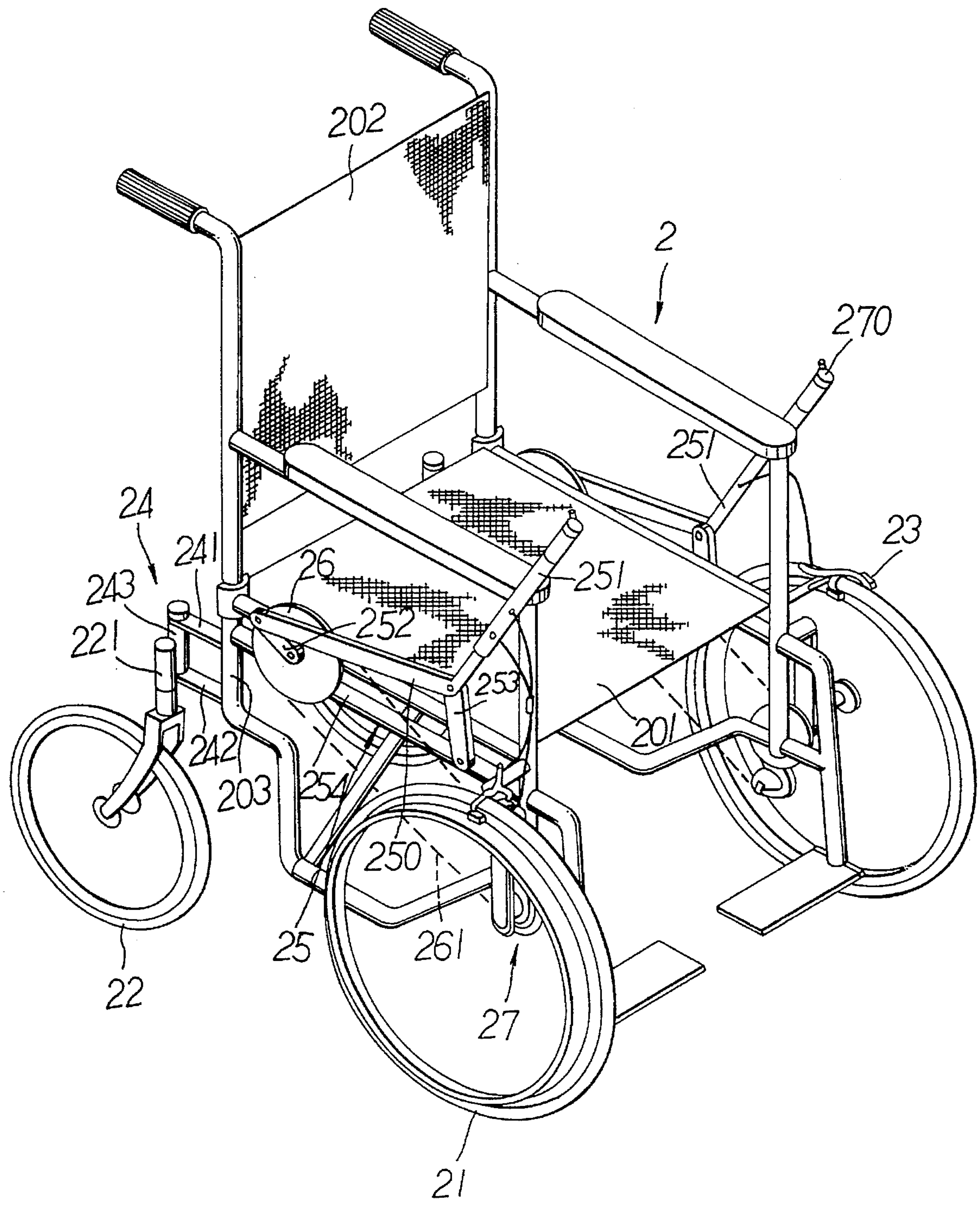
FIG. 2 shows a perspective schematic view of a manually-operated wheelchair of the present invention.
Figure 3:
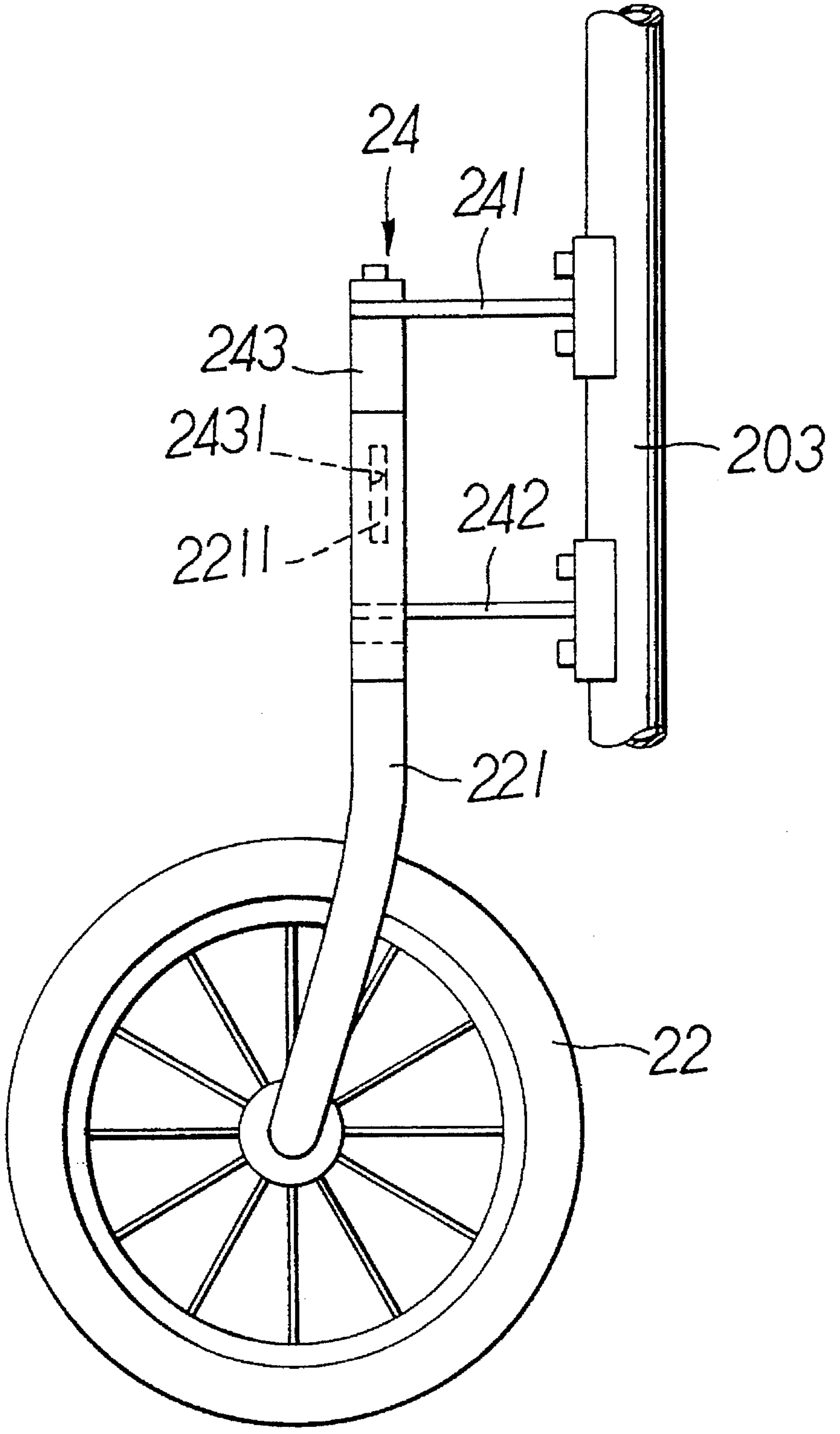
FIG. 3 shows a partial side view of the manually-operated wheelchair of the present invention.

As shown in FIG. 2, a manually-operated wheelchair 2 embodied in the present invention comprises a seat frame 20 to which two front wheels 21 and two rear wheels are fastened pivotally. The seat frame 20 is provided with a seat pad 201 of a soft material and with a backrest 202 and is foldable. The front wheels 21 are greater in size than the rear wheels 22 and are provided respectively with a yoke-shaped brake 23 which can be actuated to slow down or stop the wheel in motion. The wheelchair 2 is further provided respectively under the armrests thereof with a connection rod control mechanism 25. In addition, the wheelchair 2 is provided respectively between the seat frame 20 thereof and two rear wheels 22 thereof with a suspension device 24. As shown in FIG. 3, the suspension device 24 comprises mainly an upper resilient piece 241, a lower resilient piece 242, a fixation rod 243, and a connection rod 221. The upper and the lower resilient pieces 241 and 242 are fastened respectively at one end thereof with a support rod 203 of the seat frame and at another end thereof with the fixation tube 243 which is in turn fastened at the lower end thereof with the upper end of the connection rod 221 having a lower end which is fastened with the axle of the rear wheel 22. The fixation tube 243 is provided in the wall thereof with a retaining hole 2431 while the connection rod 221 is provided with a retaining portion 2211 engageable securely with the retaining hole 2431, thereby enabling the rear wheel 22 to be suspended from the support rod 203 of the seat frame 20 of the wheelchair 2.

Figure 4:
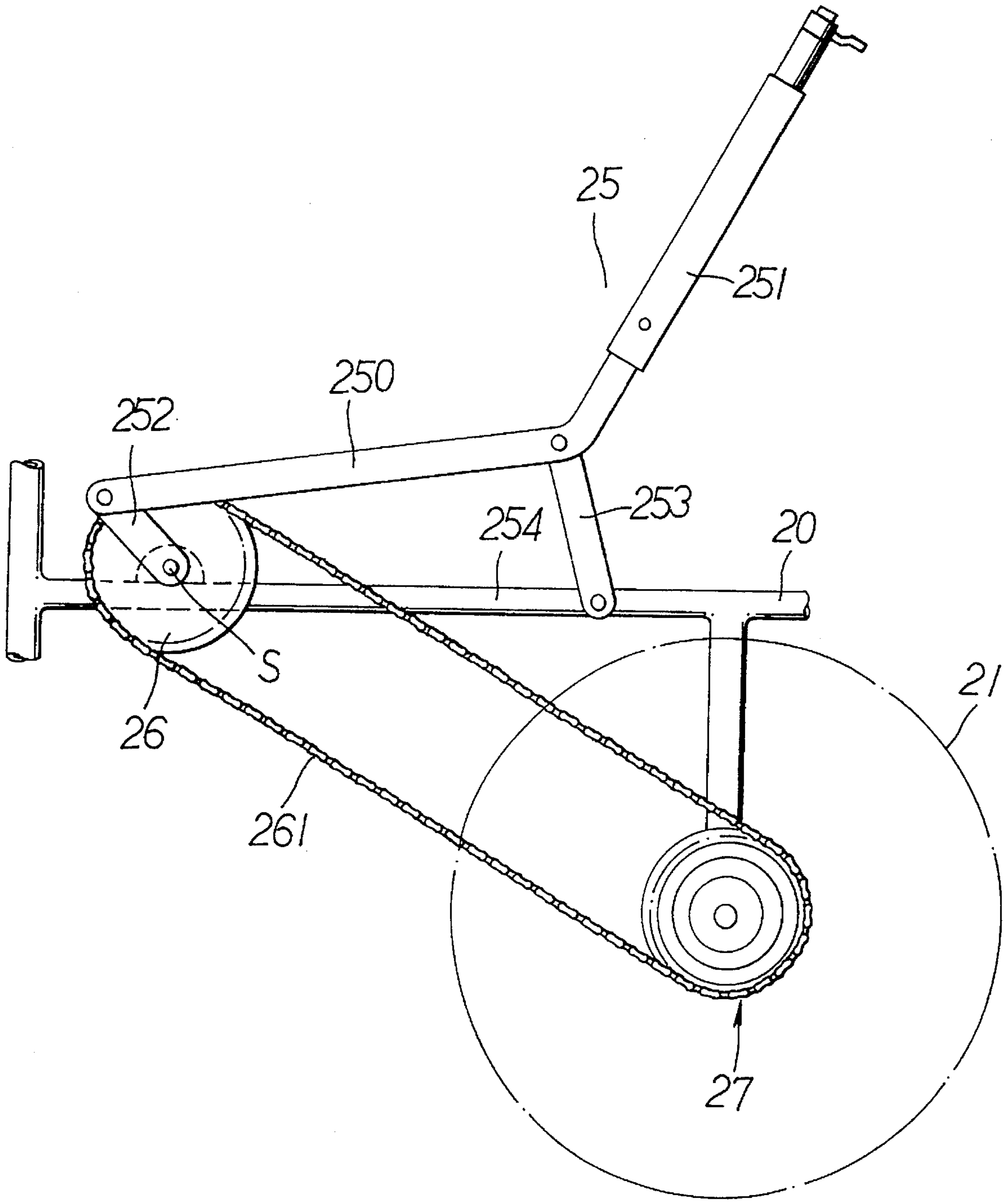
FIG. 4 is a schematic view illustrating a connection rod control mechanism at work according to the present invention.

As shown in FIGS. 2 and 4, the wheelchair 2 of the present invention is provided respectively under the left and the right armrests thereof with the connection rod control mechanism 25, which comprises a coupling rod 250, a operating rod 251 fastened at one end thereof with the coupling rod 250, a crank 252 fastened pivotally at one end thereof with the coupling rod 250, a rocking rod 253 fastened pivotally at one end thereof with the coupling rod 250, and a fixation rod 254 to which the crank 252 and the rocking rod 253 are fastened pivotally at another end thereof and separately, in which the fixation rod 254 forms one part of the seat frame 20. A transmission wheel 26 is mounted on a pivoting point S of the crank 252 and the fixation rod 254 such that the transmission wheel 26 and the crank 252 can be actuated synchronously. The axle of the front wheel 21 is provided with a variable speed transmission device 27 as those conventionally used in the bicycles. The transmission wheel 26 and the variable speed transmission device 27 provided on the axle of the front wheel 21 are connected with a transmission chain 261 for transmitting motion from the transmission wheel 26 to the front wheel 21. In other words, when the operating rod 251 is swiveled back and forth, the connection rod control mechanism 25 is actuated so as to cause the transmission wheel 26 to turn. The motion of the transmission wheel 26 is than transferred to the front wheel 21 via the transmission chain 261.

Figure 5:
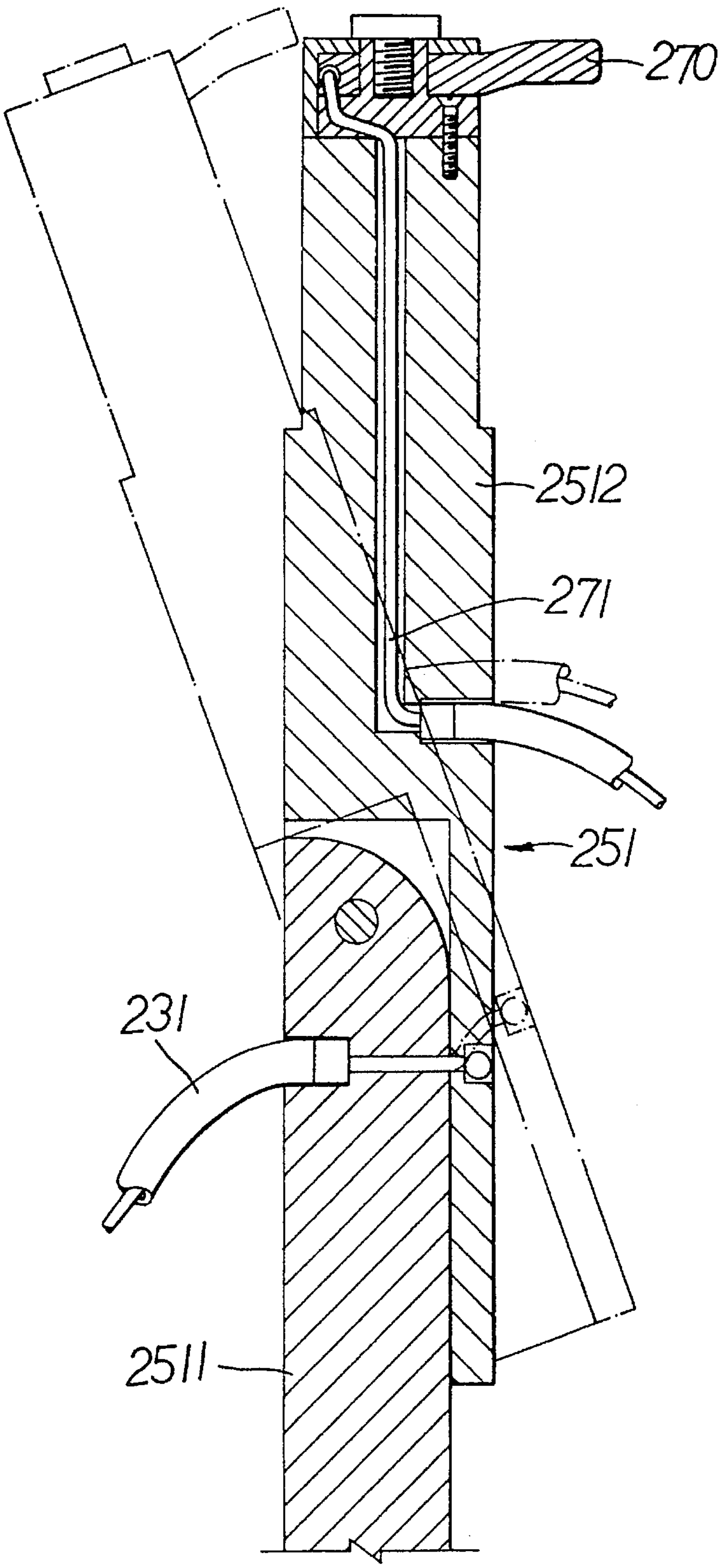
FIG. 5 shows a partial sectional view of a operating rod of the connection rod control mechanism of the present invention.

As shown in FIG. 5., the operating rod 251 of the connection rod control mechanism 25 is composed of a main rod 2511 and an auxiliary rod 2512 which is fastened pivotally at one end thereof with the top end of the main rod 2511. The auxiliary rod 2512 is provided at the top end thereof with a control button 270 which is fastened with a control wire 271 of the variable speed transmission device 27. As a result, the speed-changing action can be brought about by rotating the control button 270 with a finger. A brake line 231 is fastened at one end thereof with the brake 23. Another end of the brake line 231 is passed through an aperture formed on the main rod 2511 and the auxiliary rod 2512, and is then fastened with the outer side of the auxiliary rod 2512. When the auxiliary rod 2512 is swiveled inwards, as indicated by the dotted lines in FIG. 5, the brake line 231 is so pulled as to trigger the braking action of the brake 23.

In operation, two operating rods 251 are swiveled back and forth to actuate the two connection rod control mechanisms 25. The power is then transmitted from the operating rods 251 to the front wheels 21 from the transmission wheels 26 via the transmission chains 261, thereby bringing about the forward movement of the wheelchair 2 of the present invention. The wheelchair 2 can be caused to make a turn by swiveling slightly or inwardly (actuating the brake 31) one of the two operating rods 251 and by swiveling back and forth another one of the two operating rods 251 at the same time. As a result, two front wheels 21 are caused to rotate at different speeds. For example, the wheelchair 2 of the present invention can be caused to make a right turn by slowing down the swiveling motion of the operating rod 251 of the connection rod control mechanism 25 which is located at the right-hand side of the wheelchair 2, thereby resulting in a reduction in the rotating speed of the right front wheel 21. Since the left front wheel 21 keeps moving at a relatively faster speed, the wheelchair 2 is caused to turn to the right. The wheelchair 2 of the present invention can be caused to come to a stop immediately by swiveling both operating rods 251 inwardly to trigger the braking action of the brakes 23. Moreover, the wheelchair 25 in motion can be caused to move at various speeds by rotating the control buttons 270 of the operating rods 251 with fingers.

It is therefore readily apparent that the wheelchair 2 of the present invention has inherent advantages, which are described explicitly hereinafter.

The wheelchair 2 of the present invention can be operated easily by a person who is unable to walk and is confined to a wheelchair. On the basis of a series of tests done by this inventor of the present invention, the wheelchair 2 of the present invention can be caused to move at a speed of 1.39 m/s when the operating rods 251 of the wheelchair 2 are swiveled with hands at a speed of 0.31 m/s. On the other hand, the speed of .the wheelchair 2 of the present invention can be as high as 5.6 m/s if the swiveling speed of the operating rods 251 of the wheelchair 2 reaches a high level of 1.39 m/s. In addition, the front wheels of the wheelchair 2 of the present invention are provided respectively with a brake which can be activated easily by swiveling the operating rod 251 inwardly.

The wheelchair 2 of the present invention is safe to operate by virtue of the fact that the wheelchair 2 of the present invention is provided with two front wheels which are greater is size than the rear wheels which are suspended from the seat frame of the wheelchair 2, and that the wheelchair 2 of the present invention is provided with a relatively large bottom area so as to enhance the stability of the wheelchair 2 in motion. In other words, the wheelchair 2 of the present invention is relatively safe to operate even on a bumpy surface.

The wheelchair 2 of the present invention is made in conformity with the engineering of human body and can be therefore operated comfortably by a person who is unable to walk and is confined to a wheelchair. The motion of the wheelchair 2 of the present invention can be controlled easily with both hands of the occupant of the wheelchair. In addition, the occupant is seated uprightly, comfortably and naturally on the wheelchair 2 of the present invention.

The embodiment of the present invention described above is to be regarded in all respects as merely illustrative and not restrictive. Accordingly, the present invention may be embodied in other specific forms without deviating from the spirit thereof. The present invention is therefore to be limited only by the scope of the following appended claims.

What is claimed is:

1. A manually-operated wheelchair comprising a frame to which two front wheels and two rear wheels are fastened pivotally, wherein said frame is provided respectively on both left and right sides thereof with a horizontal fixation rod; and a connection rod control mechanism provided respectively on both left and right sides of said frame comprising a coupling rod, an operating rod fastened at one end thereof with said coupling rod, a crank fastened pivotally at one end thereof with said coupling rod and at another end thereof with said horizontal fixation rod, a rocking rod fastened pivotally at one end thereof with said coupling rod and at another end thereof with said horizontal fixation rod, a transmission wheel which is mounted on a pivoting point of said fixation rod and said crank and is fastened securely with said crank such that the transmission wheel and the crank can be actuated synchronously, and a transmission means connecting said transmission wheel to an axle of said front wheel for transmitting motion from said transmission wheel to said front wheel.

2. The manually-operated wheelchair as defined in claim 1, wherein said two front wheels are greater in size than said two rear wheels.

3. The manually-operated wheelchair as defined in claim 1 wherein said frame further comprises a brake having a brake line for each one of said two front wheels, wherein said brake is of a yoke-shaped construction, the operating rod is composed of a main rod and an auxiliary rod which is fastened pivotally at one end thereof with the top end of the main rod, and one end of said brake line is fastened with said brake, and another end of the brake line is passed through an aperture formed on the main rod and the auxiliary rod, and is fastened with the outer side of the auxiliary rod so that the brake line is so pulled as to trigger the brake to hold firmly a rim of said front wheel, when the auxiliary rod is swiveled inwards.

4. The manually-operated wheelchair as defined in claim 1, wherein said two rear wheels are suspended respectively from said frame by a suspension means.

5. The manually-operated wheelchair as defined in claim 4, wherein said suspension means comprises an upper resilient piece, a lower resilient piece, a fixation tube, and a connecting rod, said .upper resilient piece and said lower resilient piece being fastened respectively at one end thereof with a support rod of said frame and at another end thereof with said fixation tube which is fastened at a lower end thereof with an upper end of said connecting rod having a lower end fastened with an axle of said rear wheel.

6. The manually-operated wheelchair as defined in claim 1, wherein said transmission means comprises a transmission chain, a variable speed transmission device mounted on the axle of said front wheel, wherein the transmission wheel and the variable speed transmission device are connected with the transmission chain for transmitting motion from the transmission wheel to the front wheel, and a control wire fastened at one end thereof with a control button provided on said operating rod and at another end thereof with said variable speed transmission device such that said control wire is actuated to trigger said speed-changing means when said control button is rotated.

* * * * *

UNITED STATES PATENT AND TRADEMARK OFFICE

CERTIFICATE OF CORRECTION

PATENT NO. : 5,499,833
DATED : March 19, 1996
INVENTOR(S) : Her et al.

It is certified that error appears in the above-indentified patent and that said Letters Patent is hereby corrected as shown below:

On the Title page, line 18 of the Abstract, delete "chain-connect-" and insert therefore -- chain connect- --.

Col. 2, line 7, delete "With" and insert therefore -- with --.

Col. 4, line 6, delete "0n" and insert therefore -- On --.

Col. 5, line 20, delete ".upper" and insert therefore -- upper --.

Signed and Sealed this

Eleventh Day of June, 1996

Attest:

BRUCE LEHMAN

Attesting Officer

Commissioner of Patents and Trademarks